US010367882B2

(12) United States Patent
Jakatdar et al.

(10) Patent No.: US 10,367,882 B2
(45) Date of Patent: Jul. 30, 2019

(54) OFFLINE CONTENT DISTRIBUTION NETWORKS

(71) Applicant: PCCW VUCLIP (SINGAPORE) PTE. LTD., Singapore (SG)

(72) Inventors: Nickhil Jakatdar, Los Altos Hills, CA (US); Arun Prakash, Santa Clara, CA (US); Areef Reza, Milpitas, CA (US); Bo Shen, Fremont, CA (US)

(73) Assignee: PCCW Vuclip (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/668,378

(22) Filed: Aug. 3, 2017

(65) Prior Publication Data

US 2017/0331885 A1    Nov. 16, 2017

Related U.S. Application Data

(63) Continuation of application No. 15/187,499, filed on Jun. 20, 2016, now Pat. No. 9,730,033, which is a
(Continued)

(51) Int. Cl.
*G06F 17/30* (2006.01)
*G06F 15/16* (2006.01)
(Continued)

(52) U.S. Cl.
CPC ...... *H04L 67/1002* (2013.01); *G06F 16/9574* (2019.01); *G06F 21/10* (2013.01);
(Continued)

(58) Field of Classification Search
USPC .................. 709/219, 202, 223, 224, 226
See application file for complete search history.

(56) References Cited

U.S. PATENT DOCUMENTS 6,763,377 B1   7/2004  Belknap et al.
7,136,945 B2  11/2006  Gibbs et al.
(Continued)

OTHER PUBLICATIONS

Indonesian Patent Office, Application No. P00201600330, Foreign Office Action dated Apr. 10, 2018.
(Continued)

*Primary Examiner* — Jude Jean Gilles
(74) *Attorney, Agent, or Firm* — EIP US LLP

(57) ABSTRACT

Approaches, techniques, and mechanisms are disclosed for the secure distribution of media content to devices having minimal or no Internet connectivity. Computing devices referred to herein as "local servers" are strategically deployed at various locations, such as stores and other public locations. Packages of media contents are stored on the local servers, and may be updated using various online and/or offline data transfer techniques. Portable devices may directly connect to the local servers via various types of proximity-based connections, such as by wireless local area networks, by wired connections over Universal Serial Bus cables, or by sharing of removable media such as Secure Digital cards. The local servers may copy their media contents to authorized devices when such connections are established. The contents on a device may be automatically be updated the next time the device connects to one of the local servers, so as to include newly selected and/or available content.

20 Claims, 3 Drawing Sheets

Related U.S. Application Data continuation of application No. 14/878,360, filed on Oct. 8, 2015, now Pat. No. 9,374,685, which is a continuation of application No. 14/600,003, filed on Jan. 19, 2015, now Pat. No. 9,197,696.

(51) Int. Cl.

| | | |
|---|---|---|
| *H04L 29/08* | (2006.01) | |
| *G06F 16/957* | (2019.01) | |
| *G06F 21/10* | (2013.01) | |
| *H04L 29/06* | (2006.01) | |
| *H04W 4/06* | (2009.01) | |
| *H04W 12/08* | (2009.01) | |

(52) U.S. Cl.
CPC ............ *H04L 63/102* (2013.01); *H04L 67/06* (2013.01); *H04L 67/10* (2013.01); *H04L 67/1097* (2013.01); *H04L 67/141* (2013.01); *H04W 4/06* (2013.01); *H04W 12/08* (2013.01)

(56) References Cited

U.S. PATENT DOCUMENTS

| | | | |
|---|---|---|---|
| 7,925,974 B1 * | 4/2011 | McConnell | G06F 16/345 715/256 |
| 8,516,529 B2 | 8/2013 | Lajoie et al. | |
| 8,544,034 B2 | 9/2013 | Pham | |
| 8,555,406 B2 | 10/2013 | Howcroft et al. | |
| 8,572,666 B2 | 10/2013 | Bugenhagen | |
| 9,002,990 B1 | 4/2015 | Anand et al. | |
| 9,197,696 B1 | 11/2015 | Jakatdar et al. | |
| 9,219,790 B1 * | 12/2015 | Filev | H04L 67/22 |
| 9,326,016 B2 | 4/2016 | Grasset | |
| 9,374,685 B1 | 6/2016 | Jakatdar et al. | |
| 9,659,481 B2 * | 5/2017 | Himmelmann | G08B 21/245 |
| 9,730,033 B2 | 8/2017 | Jakatdar et al. | |
| 9,979,990 B2 * | 5/2018 | Filev | H04N 21/25866 |
| 10,152,989 B1 * | 12/2018 | Brown | G06F 16/683 |
| 2003/0046286 A1 | 3/2003 | Jacobs et al. | |
| 2007/0078885 A1 | 4/2007 | Klein | |
| 2007/0162702 A1 | 7/2007 | Lei et al. | |
| 2007/0276925 A1 | 11/2007 | La Joie et al. | |
| 2007/0276926 A1 | 11/2007 | LaJoie et al. | |
| 2008/0209491 A1 | 8/2008 | Hasek | |
| 2010/0080384 A1 | 4/2010 | Lee | |
| 2010/0257203 A1 | 10/2010 | Sun | |
| 2011/0060998 A1 | 3/2011 | Schwartz et al. | |
| 2011/0305435 A1 | 12/2011 | Tanaka et al. | |
| 2012/0002520 A1 | 1/2012 | Tanaka et al. | |
| 2012/0011014 A1 | 1/2012 | Stacey et al. | |
| 2012/0117620 A1 * | 5/2012 | Cassidy | H04L 63/102 726/3 |
| 2012/0263154 A1 * | 10/2012 | Blanchflower | G06F 17/30247 370/338 |
| 2012/0300663 A1 | 11/2012 | Lu et al. | |
| 2013/0003579 A1 | 1/2013 | Lu et al. | |
| 2014/0052770 A1 | 2/2014 | Gran et al. | |
| 2014/0122589 A1 | 5/2014 | Fyke et al. | |
| 2014/0280990 A1 * | 9/2014 | Dove | H04L 65/601 709/228 |
| 2014/0344894 A1 | 11/2014 | Moroney et al. | |
| 2015/0023347 A1 * | 1/2015 | Kapur | H04L 12/18 370/390 |
| 2015/0025661 A1 | 1/2015 | Vega-Zayas et al. | |
| 2015/0089075 A1 | 3/2015 | Strigeus et al. | |
| 2015/0121413 A1 * | 4/2015 | Ramakrishnan | H04W 4/70 725/25 |
| 2015/0264153 A1 | 9/2015 | Anand et al. | |
| 2016/0182736 A1 * | 6/2016 | Tiger | H04W 48/18 455/406 |
| 2016/0295379 A1 | 10/2016 | Jakatdar et al. | |

OTHER PUBLICATIONS

U.S. Appl. No. 15/668,378, Non-Final Office Action dated Jun. 1, 2018.
U.S. Appl. No. 14/600,003, Notice of Allowance dated Sep. 3, 2015.
U.S. Appl. No. 14/878,360, Notice of Allowance dated Jan. 29, 2016.
U.S. Appl. No. 15/187,499, Non-Final Office Action dated Aug. 18, 2016.
U.S. Appl. No. 15/187,499, Notice of Allowance dated Mar. 28, 2017.

* cited by examiner

OFFLINE CONTENT DISTRIBUTION NETWORKS

PRIORITY CLAIM

This application claims benefit under 35 U.S.C. § 120 as a Continuation of U.S. application Ser. No. 15/187,499, filed Jun. 20, 2016, which claims benefit under 35 U.S.C. § 120 as a Continuation of U.S. application Ser. No. 14/878,360, filed Oct. 8, 2015, which claims benefit under 35 U.S.C. § 120 as a Continuation of U.S. application Ser. No. 14/600,003, filed Jan. 19, 2015, the entire contents of each of which is hereby incorporated by reference as if fully set forth herein. The applicant(s) hereby rescind any disclaimer of claim scope in the parent application(s) or the prosecution history thereof and advise the USPTO that the claims in this application may be broader than any claim in the parent application(s).

TECHNICAL FIELD

Embodiments relate generally to distribution of media content, and, more specifically, to techniques for distributing media content in areas with minimal data network connectivity.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A variety of systems and techniques exist for distributing media content to media playback devices. Media playback devices may include, without limitation, mobile phones, tablets, laptop or desktop computers, set-top boxes, and other consumer electronic devices. Many existing systems and techniques rely upon media playback devices that have nearly ubiquitous access to a network, such as a cellular phone network, the Internet, and/or a cable network, over which the media content is distributed. A media distributor will typically have a large catalog of available media content stored on one or more media distribution servers that are deployed at various locations within the network. The catalog will typically be much larger in storage size than the media playback devices are capable of storing. Hence, the servers will typically provide interfaces by which a user may browse the catalog over the network using various applications at media playback devices operated by the user. Users may select specific items of media content from the catalog, which are then transferred over the network from the servers to the media playback devices.

The media content may be viewed in a "streaming" manner, in that the receiving media playback device is configured to begin playing the media content while it is still receiving the media content. Or, the content may be stored at the media playback device for subsequent viewing at some time after the content is downloaded. The network is furthermore typically utilized for determining whether the media playback device is authorized to play certain media content. For instance, a user may be required to "log-in" to a media distribution server from time to time in order to view content from the media distribution server. Or, the media playback device may be configured to authenticate itself to the media distribution server before being allowed to play media content from the media distribution server.

Media distribution techniques and systems such as described above work best in geographic areas where media playback devices frequently have direct access to the network at which the media distribution server(s) are deployed. However, in many parts of the world, such as in developing countries, access to such networks may be limited and/or prohibitively expensive. Consequently, many existing systems and techniques for distributing media content in these parts of the world are deficient.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
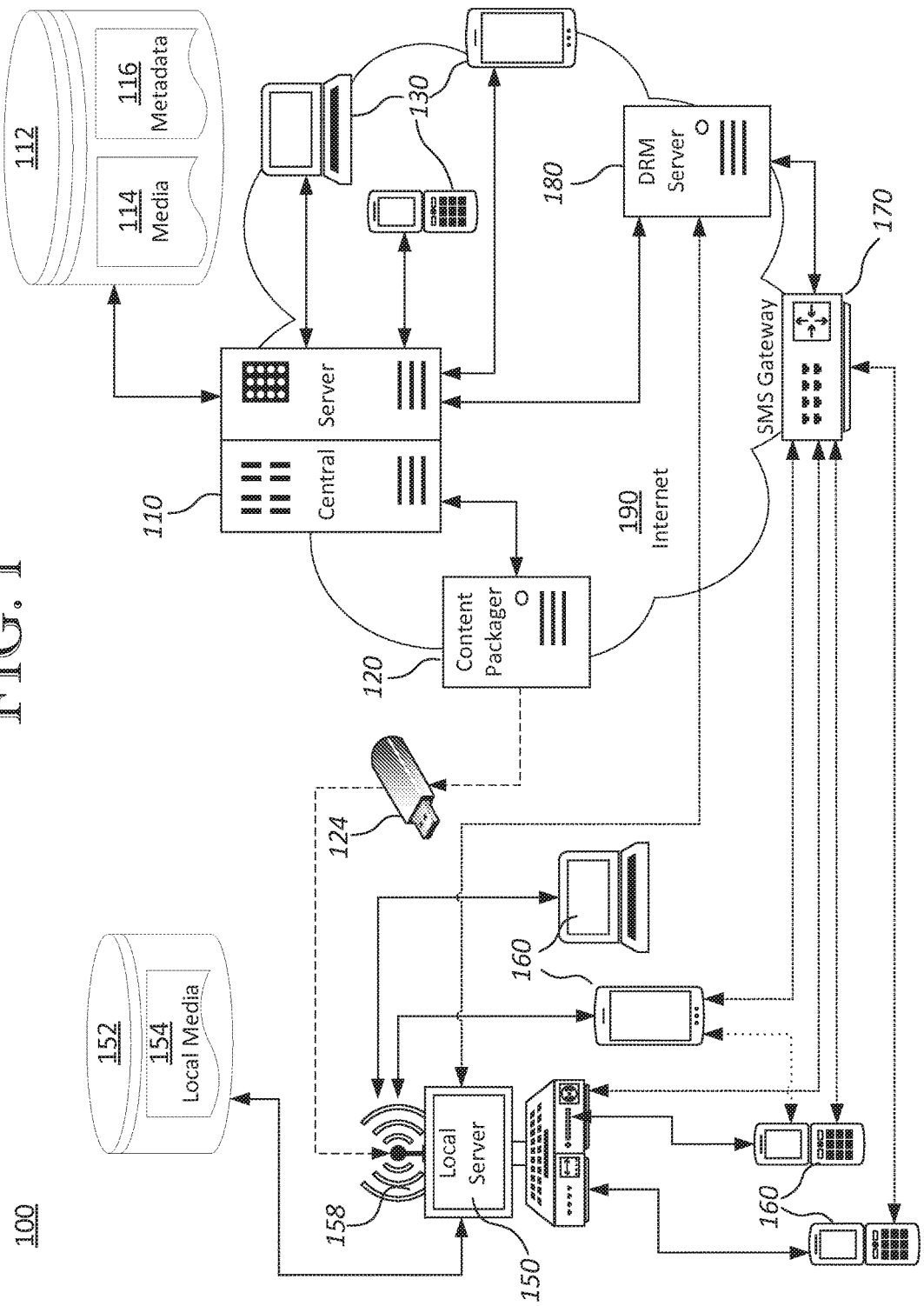
FIG. 1 is an illustrative view of various aspects of an example system in which the techniques described herein may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
    2.0. Structural Overview
    2.1. Central Content Distribution Server
    2.2. Content Packages
    2.3. Local Content Distribution Servers
    2.4. Offline Client Devices
    2.5. Client Applications
    2.6. Digital Rights Management
    2.7. Variations
    3.0. Functional Overview
    3.1. Local Content Server Deployment
    3.2. Distribution of Content to Local content servers
    3.3. Device Provisioning
    3.4. Offline Transfer to Portable Devices
    3.5. Rights Management and Payment
    3.6. Miscellaneous
    4.0. Example Embodiments
    5.0. Implementation Mechanism—Hardware Overview
    6.0. Extensions and Alternatives

1.0. General Overview

Approaches, techniques, and mechanisms are disclosed for the secure distribution of media content to devices having minimal or no Internet connectivity. Computing devices referred to herein as "local servers" are strategically deployed at various locations, such as stores and other public locations, which may not necessarily have access to the Internet. Packages of media contents are stored on the local servers, and may be updated using various online and/or offline data transfer techniques. Portable devices may directly connect to the local servers via various types of proximity-based connections, such as by wireless local area networks, by wired connections over Universal Serial Bus ("USB") cables, or by sharing of removable media such as Secure Digital ("SD") cards. The local servers may copy their media contents to authorized devices when such connections are established. The contents on a device may be automatically updated the next time the device connects to one of the local servers, so as to include newly selected and/or newly available content.

In an embodiment, a user may pay for his or her content using any of a variety of payment arrangements, including billing by a merchant on whose premises a local server has been deployed, billing by a mobile network service provider, or billing by the content distributor. Depending on the embodiment, access to the content may be purchased on a subscription basis, or ala carte for individual content items. In an embodiment, the content is protected using any suitable digital rights management scheme. Using minimal bandwidth, keys or codes for decrypting or unlocking content may quickly be distributed via a centralized server to devices or local servers, once a devices' right to access the content has been verified. For devices and/or local servers that lack Internet access, transactions and/or provision of any necessary keys or codes may be conducted via Short Message Service ("SMS") messages.

In an embodiment, a device is provisioned for access to the content distribution system by a user or merchant installing an application on the device. Then, the user or merchant may use the application to register the device with the content distribution system. Payment information may optionally be taken at the time of registration. The installed application is used to decrypt, play, or otherwise allow access to content downloaded from a local server. The application may furthermore be responsible for automatically connecting to a local server and downloading new content. In an embodiment, the application may provide various interfaces for browsing content catalogs, selecting new content, paying for new content, and/or sharing content or content catalogs with other devices.

In other aspects, the invention encompasses a computer apparatus and a computer-readable medium configured to carry out the foregoing steps.

2.0. Structural Overview

FIG. 1 is an illustrative view of various aspects of an example system 100 in which the techniques described herein may be practiced, according to an embodiment. System 100 comprises one or more computing devices. These one or more computing devices comprise any combination of hardware and software configured to implement the various logical components described herein, including components 110-190. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

2.1. Central Content Distribution Server

System 100 comprises one or more central content distribution servers 110, also referred to herein as central servers 110. A central server 110 is a set of one or more computer devices, coupled together by one or more networks, that are collectively configured to provide various functionality as described herein. The central server 110 will typically be operated for or on behalf of a content distributor.

Central server 110 includes or is connected to one or more data repositories 112. Data repositories 112 store media content 114 that is retrievable by central server 110. Data repositories 112 may take any of a variety of forms, such as file systems, databases, and so forth. Depending on the embodiment, media content 114 may include any of a variety of media content items, such as digital video files, digital music files, installable computer game files or other software applications, and so forth. Data repositories 112 further store metadata 116, associated with the media content 114, that describe various aspects of each individual item of media content. Example metadata 116 may include content titles, descriptions, thumbnails, categorical data, digital rights management ("DRM") data such as licensing constraints or decryption keys, rendering information, content trailers, associated advertisements, and so forth.

Central server 110 may optionally be coupled to any number of online client computing devices 130 via one or more wide area networks 190, such as the Internet. Online client computing devices 130 may include, for instance, mobile phones, personal computers, and/or any other suitable computing devices. Central server 110 may be configured to communicate directly with web browsers and/or other applications on the online client devices 130 to provide the online client devices 130 with access to items of media content 114 via any suitable content streaming or downloading technique.

2.2. Content Packages

In an embodiment, system 100 includes a content packaging component 120 configured to generate content packages 124. Content packages 124 are data structures that store groups of media content 114 and associated metadata 116 from data repository 112 in a common format. The exact format of each content package 124 may vary depending on the embodiment, but may include, without limitation, a directory or other hierarchical structure, a compressed file, a database, and/or a table. Content packages 124 may include, for instance, a group of video clips, different versions of those clips for different device profiles, associated titles and descriptions, thumbnails, trailers, advertisements, and/or categorical data. Depending on the embodiment, different content packages 124 may or may not include a same item of media content 114.

Content packaging component 120 may be implemented as an application or other set of computer processes running on central server 110, or on a separate set of one or more computing devices that are communicatively coupled to data repository 112. Content packaging component 120 implements logic for retrieving a defined set of media content 114 and associated metadata 116, and generating an appropriate content package 124 based thereon. In an embodiment, content packaging component 120 is further configured to store copies of a given content package 124 on different removable media, such as the USB memory stick as depicted in FIG. 1. In an embodiment, content packaging component 120 may further or instead be configured to send content packages 124 to various devices over one or more networks, such as Internet 190.

Content packaging component 120 may further implement logic for defining the group of items of media content 114 that are to be included in a given content package 124. This logic may, in some embodiments, be at least partially automated. For instance, content packages 124 may be formed based on various items of metadata 116, such as release dates, studios, genres, series, and/or any other suitable metadata 116. The logic for defining groups may also or instead comprise logic for generating user interfaces and receiving, via those interfaces, user input from a human operator that selects media items to include in a group.

2.3. Local Content Distribution Servers

System 100 further comprises local content distribution servers 150, which are also referred to herein as local servers 150. Local servers 150 are stand-alone computing devices. In an embodiment, local servers 150 are deployed strategically in various public or semi-public locations, such as in mobile phone stores, coffee shops, video stores, grocery stores, train stations, busses, airplanes, airports, and so forth. A local server may be, without limitation, a desktop computer, a laptop, a kiosk, a mobile phone, a headless computing appliance, or any other suitable type of computing device. A local server 150 may further include various peripheral devices, such as USB hubs, network switches, routers, and so forth. A local server 150 may execute a variety of computer processes configured to implement various functionalities described herein. For instance, a local server 150 may execute, without limitation, a web server, file server, web application(s), communication routing logic, and so forth.

Promoting Entities

In many embodiments, a local server 150 will be deployed on the premises of some promoting entity. The promoting entity may have requested deployment of the local server 150 or otherwise agreed to the deployment for varying reasons. For instance, a promoting entity may perceive the deployment as a potential source of additional foot traffic to the promoting entity's store. As another example, a promoting entity may be compensated using various compensation structures, such as a flat fee arrangement or a commission on content sales. A promoting entity may also, in some embodiments, support the content distribution process by provisioning client devices 160, accepting payment, updating the local server 150 or contents stored thereon, and so forth.

Local Connections

Local servers 150 comprise one or more local networking components 158. The one or more local networking components 158 are configured to establish communication links to offline client devices 160 for various purposes described herein. The communication links are such that they are only established when devices 160 are within a certain geographic proximity of a local server 150 (e.g. within a wireless transmission range of antennas attached to the local server 150, or only when connected directly by a cable to the local server 150). The communication link between a local server 150 and an offline client device 160 is described herein as a "local" connection. One example of a local connection is a wired or wireless local area network connection (in contrast to a wide area network connection such as a connection to Internet 190). Another example of a local connection is a peer-to-peer connection, such as a USB connection or an ad hoc wireless connection. In an embodiment, the communication link between a local server 150 and an offline client device 160 is a direct communication link, in that communications do not pass through intermediary devices such as routers or gateways outside of the local server 150. However, in other embodiments, the communication link does not necessarily need to be direct.

The links may be of any suitable connection type, including wired and/or wireless connections, and communications may be conducted using any suitable protocol. For instance, a local server 150 may include one or more wireless access points for communicating with clients 160 using various 802.11 protocols. As another example, a local server 150 may include one or more Bluetooth adapters for communicating with clients 160 via the Bluetooth protocol. As yet another example, a local server 150 may include various ports by which wired connections may be established with clients 160, such as Universal Serial Bus ("USB") ports, Ethernet ports, and so forth.

Offline Servers

Notwithstanding their ability to communicate with clients 160, local servers 150 may nonetheless be "offline" components of system 100, in that in many embodiments local servers 150 are configured to provide the functionalities described herein without necessarily being communicatively coupled to central server 110 or content packaging component 120. In some embodiments, local servers 150 do not have access to any network by which the local servers 150 can communicate with central server 110 and/or content packaging component 120. For instance, local servers 150 may be deployed in remote areas where Internet access is unavailable.

In other embodiments, some or all of local servers 150 may be configured to establish one or more communication links by which they may communicate with central server 110 and/or content packaging component 120. A suitable communication link to central server 110 may be established using any suitable component, including without limitation a DSL modem, a cable modem, a 3G or 4G cellular-based modem, a dial-up modem, and so forth. In many such embodiments, however, the communication link(s) will be of relatively low bandwidth and/or relatively expensive to establish, such that the communication link(s) are impractical for use by offline client devices 160 to stream or download media contents 114 from central server 120. For instance, local servers 150 may only have sporadic access to the Internet, or have access to the Internet via a service provider that imposes constraints on the amount of data that the local servers 150 may download over a given period of time.

Content Storage

Local servers 150 further comprise one or more local storage devices 152. The one or more storage devices 152 are configured to store local media content 154, which are subsets of the media contents 114 and metadata 116 found in data repository 112. In an embodiment, the local media content 154 is organized as a set of one or more content packages 124. In an embodiment, a high-speed storage media, such as a flash drive or RAID array, may be utilized for the one or more storage devices 152, so as to ensure that media content 154 may be quickly retrieved and delivered to multiple client devices 160 at a time. However, in other embodiments, any suitable storage mechanism may be utilized.

In an embodiment, a local server 150 may further comprise one or more removable storage drives by which the local server 150 may read and/or write to removable non-volatile computer-readable media, such as Secure Digital ("SD") cards or USB storage devices. In an embodiment, the removable media may, in turn, be inserted into or otherwise read by client devices 160.

In an embodiment, the removable media storage drives may further or instead be utilized to read and copy new local media content 154 to the one or more storage devices 152. For instance, content packaging component 120 may be configured to write content packages 124 to SD cards or USB drives which are then transported by mail or other suitable carrier to operators of local servers 150. The content packages 124 may then be copied from the SD cards or USB drives to the local servers 150. The removable media may be disposable, shared with other local servers 150, or returned to the operator of the content packaging tool 120 for delivery of updated or new content packages 124 in the future. In embodiments without a content packaging component 120, various items of media content 114 and metadata 116 may be copied to removable media directly from central server 110.

In an embodiment, the one or more local storage devices 152 may actually include removable storage devices. For instance, an operator of content packaging component 120 may copy a content package 124 to a USB drive and deliver the USB drive to an operator of a local server 150. The USB drive is plugged into the local server 150, and utilized as one of the one or more storage devices 152 until such time that the content packages 124 stored thereon are deemed out-of-date.

In an embodiment, a portable computing device may take the place of a removable storage device. For instance, copies of content packages 124 may be stored on a smartphone, which is configured to upload the content packages to a local server 150 via a wired or wireless communication link. In an embodiment, the smartphone may be configured to do so automatically when a connection to a local server 150 is detected (e.g. when plugged into the USB port of the local server 150, or when within proximity of a wireless access point of the local server 150).

In an embodiment where local server 150 has an at least intermittent connection to central server 110, a local server 150 may instead be configured to download some or all of local media content 154 directly from central server 110.

2.4. Offline Client Devices

System 100 further comprises offline client devices 160. Offline client devices 160, which are at times referred to herein as clients 160 or devices 160, are portable computing devices such as traditional mobile phones, smart phones, gaming devices, portable media players, tablets, laptop computers, and so forth. Devices 160 are termed "offline" devices, in that, via interactions with local server 150, they are capable of playing media contents 114 without necessarily being communicatively coupled to central server 110.

In an embodiment, some or all of devices 160 are deployed in system 100 in such a manner that they are incapable of accessing central server 110. For instance, devices 160 may be deployed in remote areas where Internet access is unavailable, unreliable, cost-prohibitive, etc. Or, devices 160 may not comprise suitable networking components for accessing the Internet. In an embodiment, some or all of devices 160 are deployed in system 100 in such a manner that the streaming or downloading of media content 114 from central server 110 is impractical or undesirable. For instance, devices 160 may have relatively low bandwidth Internet connections and/or metered Internet connections that are relatively expensive to maintain.

In some embodiments, a given device may be both an offline device 160 and an online device 130, depending on when, where, and/or how it is used. For instance, a smartphone used in a remote area without cellular data services may function as an offline device 160, whereas the same smartphone, if used in a metropolitan area, might function as an online device 130.

Instead of downloading or streaming media content 114 from central server 110, devices 160 are configured to stream or download the local copies 154 of media content 114 from local servers 150. Devices 160 may do so automatically when a connection to a local server 150 is established, or at the request of a user. Thus, for instance, a user may bring a portable device 160 into a store where a local server 150 is deployed. The portable device 160 may automatically (or at the request of the user) download specific items of media content 114 of interest while the user is shopping at the store.

A device 160 may further be configured to automatically download certain metadata 116 from a location on the content server 150. The retrieved metadata 116 may describe media content 154 that is available on the local server 150, and/or other items of media content 114. The device 160 may then present a user interface that shows the available content to a user and allows the user to select which content to download. For instance, the device 160 may present a catalog of content, from which the user may select specific items to download. Or, the user may select characteristics of content that the user would like to automatically download (e.g. by date, genre, actor, studio, subscription package, etc.). The device 160 then downloads any selected content from a local server 150.

Metadata 116 may be downloaded while the device 160 is connected to a local server 150, and then stored for use while the device 160 is not connected to any local server 150. In some embodiments, metadata 116 may optionally be downloaded directly from central server 110. The device 160 may present various navigable interfaces for browsing metadata 116 while not connected to a local server 150, and store a record of media content items specifically selected by a user and/or in which a user expressed interest. The next time the device 160 is connected to a local server 150 that stores a selected content item or item of interest, the device 160 may automatically download the content item.

A single device 160 may be connected to different local servers 150 at different times and in different locations. Different local servers 150 may provide the device 160 with access to different subsets of items in media content 114, or local servers 150 may provide access to the same subsets of items, depending on the embodiment. In an embodiment, once a device 160 has been configured to automatically connect to and download content from one local server 150, the device 160 is capable of automatically connecting to and downloading content from other local servers 150 to which the device 160 has never connected.

For instance, each of the local servers 150 may be configured to use a common local address for initiating communications with a device 160. The first time a device 160 connects to any local server 150 in system 100, the device 160 will be configured (e.g. via installing an application or other suitable set of instructions) to automatically send a message to the common local address upon connecting to certain types of networks (e.g. a network having a certain ssid or other characteristics). Then, when a device 160 connects to those types of networks, the device 160 will automatically send a message to the local address, announcing the presence of device 160. The local server 150 may then respond with information such as a catalog of contents 154 stored at the local server 150, requested items of content 154, and so forth.

However, in other embodiments, a device 160 may need to be separately provisioned for each of at least some of the local servers 150.

2.5. Client Applications

In an embodiment, one or more special content access client applications are installed on devices 160. For instance, a web server on the local server 150 may automatically direct a device 160 to an installer for a content access application when a device 160 that lacks the application attempts to connect to the local server 150. Or, a process executing on the server may automatically attempt to install the content access application on the device 160 when the device 160 is plugged into the local server (e.g. via a USB connection). As yet another example, an installer for the client access application may be executed by the device 160 from a removable storage device such as an SD card. Depending on the embodiment, the installation process may be initiated and/or conducted by the user of the device or an owner or operator of the local server 150.

Generally, a content access client application (also referred to herein as a "client application") is at least responsible for allowing the device 160 to play items of content 154 downloaded to the device 160. For instance, the client application may be or comprise media playback software. Or, the content access client application may be responsible for decrypting content items, or at least maintaining DRM keys for decrypting content items, so that another application on the device may play content. The client application may be a stand-alone application, such as a "mobile app," that a user of the device may execute directly. Or, the client application may be a background process that conducts various activities such as described herein without directly interacting with the user. As yet another example, the client application may be a "plug-in" or "extension" to another application, such as to a media player or web browser.

In an embodiment, a content access client application is also configured to communicate with counterpart content server applications executing on local servers 150 via local connections. The content access client application is more specifically configured to automatically locate a counterpart content server application (e.g. locate the IP address and/or port of the content server application), and to stream or download selected local media content 154 via communications with the content server application.

The content server applications may, in an embodiment, be configured to only send metadata 116 and/or media content 154 to the content access client applications. For instance, the content distributor may wish to ensure that media content 154 is only available to devices 160 belonging to owners who have enrolled in a certain system or paid a subscription fee. The content access application may thus send certain credentials (e.g. a signature, key, login information, etc) to the content server application. The content server application will only communicate with a client application if these credentials are determined to be valid. However, in some embodiments, a client-side digital rights management scheme may be deployed, and the content server application need not necessarily take such precautions.

The content access application may further be responsible for generating and presenting the interfaces described above, and/or for implementing various other functions of devices 160 described herein. Hence, by providing computer code for executing the one or more client applications to devices 160, an operator of system 100 may therefore be said to cause the devices 160 to perform the various device functions described herein.

2.6. Digital Rights Management

System 100 further comprises one or more digital rights management server components 180, also referred to herein as DRM servers 180. A DRM server component 180 may, in an embodiment, be integrated into content server 110. In an embodiment, a DRM server 180 may instead be external to content server 110. Generally, a DRM server 180 is responsible for providing some digital rights information necessary for a device 160 to play digitally-protected contents. The provided information may be, for instance, keys (or portions thereof) for decrypting specific items of content 114. Instead, or additionally, the provided information may be a device-specific promotion code that enables a device 160 to execute a suitable client application for playing content items 154 downloaded to the device 160. The promotion code may permit a device 160 to play any downloaded content 154, or only items of content 154 matching certain characteristics, such as belonging to a certain subscription plan or having been downloaded from a specific local content server.

DRM servers 180 may be utilized to implement any suitable DRM scheme. For instance, in an embodiment, each content item may have a decryption key that must be used to decrypt the content before a device 160 can play the content item. When downloading and/or before first playing the content item, the device 160 may be configured to send a message to a DRM server 180 requesting the decryption key. If the DRM server 180 can verify that the device 160 is allowed to play the content, the DRM server 180 may send the decryption key to the device. As yet another example, DRM keys are provided to local servers 150, which then relay the decryption keys to each device 160 when the corresponding content is downloaded. In an embodiment, the content decryption key is device-specific, such that the content decryption key can only be utilized by the receiving device 160. In an embodiment, the content decryption key is itself encrypted, and a device 160 must decrypt the encryption key using device-specific information such as a general or content-specific promotion code and/or an application signature.

In an embodiment, a content-specific partial key is stored on the local server 150 with the associated content item 154. A master key for the specific local server 150 or device 160 is distributed by the DRM server 180. A device 160 may derive the rights information necessary to decrypt a given content item 154 by combining the partial key of the given content item 154 with a suitable master key, in accordance with a DRM scheme described elsewhere in this application.

In an embodiment, a DRM server 180 is further capable of—or linked to a billing/payment server that is capable of—conducting transactions. For instance, a device 160 and/or local server 150 may be configured to transmit account identifier(s), such as a telephone number or a unique device identifier, to the DRM server 180. The DRM server 180 may then examine the associated account and determine whether a payment is needed to access a requested content item or subscription. If so, then the DRM server 180, or a backend payment server, may utilize payment information associated with the account or included with the message to conduct a financial transaction. The DRM server 180 provides the necessary keys or codes for the requested content or subscription only if the transaction was successful. As another example, a retailer at which a local server 150 is deployed may take payment for providing certain content to a device locally (i.e. in the physical store). The retailer may then send a message to a DRM server (e.g. via the local server 150 or from a retail terminal) requesting an appropriate key or code. The message may include an identifier for the retailer and an identifier for the purchased content or subscription. The retailer may then be billed for having provided the content or subscription, and the appropriate key or code may be returned to the retailer, who in turn provides it to the client. In yet other embodiments, a separate billing server may be provided for receiving records of content provided by a promoting entity, and for conducting billing based thereon.

In an embodiment, system 100 further includes an SMS gateway 170 configured to send and receive Short Message Service ("SMS") messages or other equivalent low-bandwidth messages over a network other than the Internet 190 (e.g. a cellular provider's network). The SMS gateway 170 facilitates the transmission of information between DRM servers 180 and devices 160 or local servers 150, without requiring that the devices 160 and/or local servers 150 have access to the Internet 190. In an embodiment, a user can enter keys or codes transmitted by SMS to a device 160 into suitable interface prompts in a client application or at a local server 150, thus allowing in essence two-way communication between a DRM server 180 and a device 160 and/or a local server 150 without access to the Internet. In an embodiment, some devices 160 may be capable of intercepting SMS messages from a DRM server 180, such that a user need not manually re-enter a key or code transmitted over SMS.

In an embodiment, some or all of devices 160 and/or local servers 150 may utilize a direct connection to Internet 190 for communicating with DRM servers 180, if available, since the transmissions are of relatively low bandwidth and expense.

In an embodiment, system 100 includes both a DRM server component 180 operated by the owner of the content server 110 as well as one or more third-party DRM servers 180. The third-party DRM servers 180 are generally operated by providers or producers of specific items of content 114, and responsible for providing the DRM licenses and/or keys necessary to play their respectively provided contents. The DRM server 180 operated by the owner of content server 110, meanwhile, is responsible for relaying licenses or keys from the third-party DRM servers 180, and/or releasing device-specific promotion codes that allow the devices 160 to use the client software.

2.7. Variations

System 100 illustrates only one of many possible arrangements of components configured to provide the functionality described herein. Other arrangements may include fewer, additional, or different components, and the division of work between the components may vary depending on the arrangement. For example, in some embodiments, content packaging tool 120, SMS gateway 170, and/or DRM server 180 may be omitted, along with any other components relied upon exclusively by the omitted component(s). As another example, in an embodiment, central server 110 is omitted and/or lacks the capability to send content to online clients 130. In such an embodiment, a content packaging tool 120 may generate content packages 124 directly from a data repository 112, without necessarily even being connected to the Internet 190.

In FIG. 1, the various components of system 100 are depicted as being communicatively coupled to various other components by arrows. These arrows illustrate only certain examples of information flows between the components of system 100. Neither the direction of the arrows nor the lack of arrow lines between certain components should be interpreted as indicating the existence or absence of communication between the certain components themselves. Indeed, each component of system 100 may feature an open port, API, or other suitable communication interface by which the component may become communicatively coupled to other components of system 100 as needed to accomplish any of the functions of system 100 described herein.

3.0. Functional Overview

In an embodiment, the distribution of media content to devices having minimal or no Internet connectivity is greatly simplified using techniques that involve distributing content to portable devices in public or semi-public areas via local connections to strategically deployed "offline" server devices. The processes described in this section illustrate the various example techniques for accomplishing this and other objectives.

The various elements of the described processes may be performed in a variety of systems, including systems such as system 100 described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer.

3.1. Local Content Server Deployment

Figure 2:
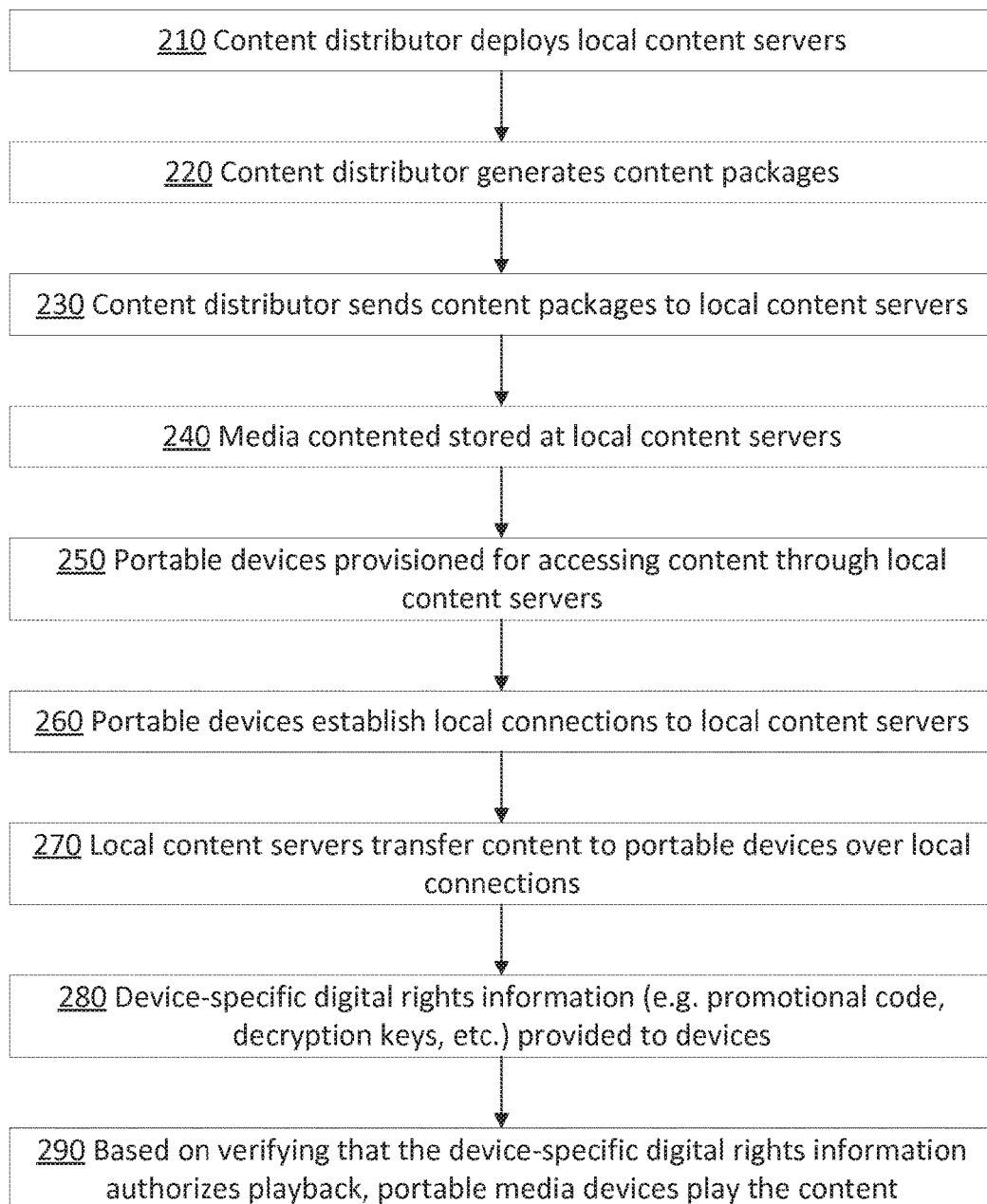
FIG. 2 illustrates an example process flow for distributing content to offline client devices.

FIG. 2 illustrates an example process flow 200 for distributing content to offline client devices, such as devices 160, according to an embodiment. At block 210, a content distributor, such as an operator of central server 110 or of data repository 112, deploys (or causes deployment of) local content servers, such as local servers 150, in different geographic locations. For instance, the content distributor may place the local content servers in stores, transportation hubs, or other strategic locations.

In an embodiment, the content distributor builds and/or assembles the local content servers using off-the-shelf computer hardware components such as one or more processors, a motherboard, one or more hard drives, and various wired and/or wireless communication interfaces. The content distributor then installs custom server application software on local content servers. The server application software, when executed, is configured to cause the computer hardware components to perform the various local server functions described herein. In an embodiment, the content distributor may further package the local content servers in distinctive housing. For instance, a local content server may be encased within a kiosk-like housing on which is depicted various advertisements meant to promote the content distributor's brand. The content distributor may then deploy the content servers at various strategic locations, and/or send the content servers to other entities, such as store owners, with instructions for deploying the content servers.

In an embodiment, the content distributor may contract with another entity to build and/or assemble the content servers. In an embodiment, pre-built computing devices such as tablets or portable devices may be used as local content servers. In an embodiment, the content distributor may send installation software to a promoting entity that allows the promoting entity to install and execute the local server application software on computing devices already owned by the promoting entity, such as on mobile phones.

3.2. Distribution of Content to Local Content Servers

At block 220, the content distributor generates one or more content packages, such as content packages 124, comprising digital media content items from a library of media contents, such as data repository 112. The content packages will typically include only a subset of content items available in a library. The content packages may be generated based on any of a variety of considerations, such as release dates, preference data, ratings, geographic area, genre, promoting entity preferences, requests from specific customers at a location to which the content package is to be sent, and so forth.

At block 230 the content distributor sends the one or more content packages to the local servers. The content distributor may send content packages using any of a variety of techniques, depending on the embodiment. For instance, content packages may be copied onto removable storage media, such as USB drives, SD cards, swappable hard disks or solid state disks, and so forth. The removable storage media may be sent by mail or otherwise physically transported to the locations at which the local content servers are deployed, with instructions to the promoting entity for adding the content packages stored on the removable storage media to the content servers. Once used, the removable storage media may optionally be returned to the content distributor for reuse. In an embodiment, service representatives may carry the removable storage media from location to location and update the local content servers for the promoting entities.

In an embodiment, blocks 220-230 are repeated on, for instance, a periodic basis. For instance, a new content package may be mailed each week or each month. In an embodiment, the local content servers are inexpensive and/or portable, such that instead of sending removable storage media to deployment locations, the content distributor periodically sends entire local content server units to a promoting entity, pre-loaded with newly generated content packages. The promoting entity may optionally return the outdated local content server to the content distributor for re-use.

In certain embodiments, if certain local content servers have a reliable Internet connection, the content distributor may send content packages to those local content servers directly over the Internet connection. In some such embodiments, a local content server may specifically request and receive individual content items directly from a central server, effectively forming its own custom content packages. For instance, if a promoting entity or customer connected to the local content server indicates an interest in content not currently found on the local content server, the local content server may attempt to download the content in the background, as resources permit. The content may then be made available for customers the next time the customers connect to the local content server.

At block 240, media content items and metadata from the content packages are stored on one or more storage devices at each local content server. If content packages are distributed on removable media, a local content server may, in an embodiment, use the removable storage media as the one or more storage devices instead of copying the content packages to another storage device. In an embodiment, promoting entities and/or local content servers may optionally pick and choose which media content items to copy to the local content server, though in other embodiments the content packages may have already been generated based on selections by the promoting entity. In an embodiment, each local content server in an area or at a certain type of location (e.g. stores within a chain of stores) may store the same media content items.

3.3. Device Provisioning

At block 250, portable devices are provisioned to access content distributed by the local content servers. In an embodiment, block 250 is only performed the first time a portable device attempts to access content at a local content server. The provisioning process may include steps such as installing a content access client application from the content distributor on the device, collecting registration information and sending the registration information to a central server, generating an account to associate with the device, collecting payment, generating or retrieving content access codes or other content rights information, and/or transferring an initial set of content items to the device. Depending on the embodiment, the provisioning process may comprise self-service and/or promoter-assisted steps. In an embodiment, block 280 may be a substep of the provisioning process. In an embodiment, certain devices may be pre-provisioned by a user or manufacturer without having ever attempted to connect to any local content server. Other aspects of example provisioning processes are described in other sections.

3.4. Offline Transfer to Portable Devices

Block 260 comprises establishing local connections between the portable devices and the local content servers. For instance, a user of the device may direct the device to connect to a named network, such as a wireless local area network or a Bluetooth personal area network. Such a network may be managed by a local content server, or by an external wireless router. Or, the device may monitor for available networks and automatically connect to the named network. Once connected, the device, or a content access client application installed thereon, may automatically attempt to contact the local content server at a common IP address or hostname that is assigned to the local content servers. Or, the device may monitor communications over the network for a message announcing the location of a local content server. In an embodiment, a user of a device may additionally or instead plug the device into a USB or other wired port of the local content server, thereby establishing a direct peer-to-peer connection. Peer-to-peer wireless connections may also be established, in certain embodiments.

At block 270, the local content servers transfer content to portable devices. The transfers may occur in a variety of manners depending on the embodiment. For instance, upon connecting to a local content server, a device may automatically be directed to download any and all content available on the local content server that is not already stored on the device. For instance, a local server may store, at a given time, five different movies, which are updated on a periodic basis. Upon a new movie replacing an old movie on the local server, devices that had previously loaded the old movie will be updated to store the new movie the next time the devices connect to the local server. Or, based on a subscription code supplied by the device, the local content server may direct the device to download a specific subset of content to which the device is subscribed. Any suitable file transfer protocol may be utilized.

Block 270 may be repeated any time a device establishes a local connection. Expired, viewed, and/or old content items on the device may be removed to make room for new content items using various prioritization schemes. Similarly, a variety of prioritization schemes may be utilized to determine which contents to transfer to a device if the device lacks sufficient room to store all of the content identified for the device.

In an embodiment, the local content servers may provide different content versions to different types of devices according to device capabilities and/or device preferences. A content package may include a number of different versions of the same content, encoded using different profiles. For instance, some profiles may provide higher resolutions and/or qualities at the costs of an increased storage size and higher processor utilization, whereas other profiles may provide lower resolutions and/or profiles for devices with less resources and/or for quick transfers if a user does not wish to wait for a higher resolution version. To this end, the local content server may be configured to detect device capabilities, and/or receive device specifications or user preferences directly from the device.

In an embodiment, the device may request specific content items from the content server. For example, the device may download, from a content server or from a central server, metadata describing available media items on one or more of the content servers. The device may present an interface displaying a menu of available content items in a content access application. Using this interface, a user may select specific content items that the user wishes to automatically download from a content server the next time the user is connected to one of the content access servers that has the selected content items available. Similar interfaces for allowing a user to select content items to download may be presented on a centralized website, or using input/output components connected directly to a local content server.

In an embodiment, to speed up transfer, or to allow content transfer when other types of transfers are not possible, the local content server may copy content items to a removable storage media, such as an SD card, that is insertable into the portable device. Typically, the content will then remain on the removable storage media, and the device will play the content directly from the removable storage media. The removable storage media may be removable storage media already owned by the device owner, or the removable storage media may be sold to the user by the promoting entity. In an embodiment, the removable storage media may be sold pre-packaged by the content distributor or the promoting entity with content already stored thereon. In an embodiment, the removable storage media may be sold with an installer for the content access client software stored thereon. The removable storage media may optionally be configured to install the content access client software on the device automatically. In an embodiment, the contents of such a removable storage media may subsequently be replaced—potentially automatically—upon the device establishing any of the above-described types of local connections with any of the local content servers.

3.5. Rights Management and Payment

At block 280, digital rights data are provided to devices. The digital rights information may be necessary for a device to play some or all of media content distributed by the local content servers. In some embodiments, a device must also or instead send valid digital rights information for a content item or for a subscription associated with the content item before a local content server will transmit the content item. The digital rights information may include, for instance, decryption keys for decrypting specific items of content, a key for decrypting encrypted copies of the decryption keys, a license key for unlocking access to a content access client application, a promotion code for unlocking a subscription to certain types of content, a master key for a local server or device, a partial content-specific decryption key, or any other suitable digital rights management data.

The digital rights information may be provided to a device in a variety of manners. For example, when provisioning the device, a content access application on the device may request a promotional code before allowing a user to launch the application and/or download content. The device may request the promotional code from a digital rights management server over an Internet connection or via SMS, using a unique identifier for the device such as a phone number or hardware identifier. The digital rights management server uses the supplied information to generate an appropriate promotional code. In an embodiment, the generated promotional code may also be specific to a subscription package specified in the request, or otherwise associated with the device, in that it only allows the device to download and/or view content within the subscription package.

As another example, the device may prompt the user or a promoter to enter a promotional code. For instance, the content server or promoting entity may request a promotional code from the digital rights management server on behalf of the device, and display the promotional code so that it may be entered on the user's device. In an embodiment, the local content server may request and transfer a promotional code directly to the device. As yet another example, the device may be configured to request a decryption key for specific content from a digital rights management server upon receiving the content and/or before playing the content.

In an embodiment, the digital rights management server may be configured to provide digital rights information only upon verifying payment for a subscription package or specific content item associated with the digital rights information. The digital rights management server may, for instance, conduct a transaction using payment information within the request and/or within an account registered to the device during a provisioning process. Or, the digital rights management server may verify that the request includes a valid transaction identifier or signature supplied by a promoting entity, indicating that payment has already been taken for the subscription package or specific content item.

In an embodiment, the digital rights information is time-limited. For instance, a subscription code may expire after a certain period of time, and block 280 must be repeated before the device can access content again.

Example DRM Schemes

Some example suitable digital rights management scheme involve splitting responsibility for digital rights management key distribution between the local servers and the DRM server. In embodiments that employ such schemes, each local server stores a partial key for each item of content. The partial key for a given item of content, taken alone, is insufficient to decrypt the item of content. The partial key may have been provided to the local server, for instance, in metadata distributed to the local server with the content, or in metadata downloaded separately by the local server from the central content server or the DRM server.

Meanwhile, the DRM server stores one or more master keys. In an embodiment, a separate master key exists for each local server. However, in other embodiments, there may be a separate master key for each device, or a single master key that is associated with more than one local server. As with the partial key, the master key alone is likewise insufficient to decrypt any given item of content.

Each device is configured to receive the relevant master key from the DRM server during a device provisioning process. For instance, during an initial registration process, an application distributed and installed by the operator of content server may be configured to request the master key for a given local server directly from the DRM server. Upon validating certain information included in the application's request for a master key, such as a telephone number, user name, password, and/or any other suitable credentials, the DRM server may return the master key to the application.

In some embodiments, the request for the master key and the master key may be transmitted over a connection to the Internet or other wide area network. In one such embodiment, this may be the only communication for which an Internet connection is required of a device, since the content and relevant partial keys may be retrieved from a local content server. In some embodiments, even the request for the master key and the master key are not transmitted via an Internet connection at the device. Instead, the request and the master key may be transmitted using a messaging protocol such as binary SMS.

Whatever the communication mechanism, in some embodiments the master key may be encrypted by the DRM server in such a manner that only the intended recipient device may decrypt it. For instance, the DRM server may encrypt the master key using a device-specific identifier that is supplied to the DRM server by the device during a provisioning process. The device then uses this identifier to decrypt the master key as needed.

In an embodiment, the device is configured to automatically receive and store the master key without the involvement of a user. In other embodiments, the device may prompt the user to input the master key, or an encrypted form of the master key, manually via any suitable user interface. In such embodiments, the master key may be requested by and/or returned to an entirely different device.

In an embodiment, a local server may serve as a proxy by which the master key is retrieved for a given device. For instance, the local server may receive device-specific credentials for a given device, either from the device directly, or entered by a user or a promoting entity. The local server may then request the master key using the credentials, and supply the returned master key (or encrypted master key) to the device.

Each device is configured to also receive the partial key for a given content item from the local server. For instance, the local server may include the partial key in metadata found in a file, directory, or database record that stores or is otherwise associated with the content item. An operator-installed application on the device may be configured to download the partial key or the entire metadata automatically when downloading a given item of content. In some embodiments, a device may be configured to download the partial key or the entire metadata, before even requesting the content, or after receiving the content.

Each device is configured to generate a content-specific key for a given item of content by executing a particular algorithm that is a function of the master key of the local server from which the content is downloaded, and the partial key of the given content item. For example, the content-specific key may be the partial key combined with the master key. The device may store the content-specific key locally for use in decrypting the given content item. The content-specific key may, in some embodiments, be stored in a secure form, such that it may only be accessed and/or decrypted by the device.

In an embodiment, the master key returned to the device may encode information indicating various criteria relevant to the device, such as a subscription level of the device, a time period during which the subscription level is valid, and/or other suitable criteria. Hence, different master keys may be exist for different subscription levels or time periods. The algorithm employed by the application to generate content-specific keys will only work with a given master key if the criteria encoded in the master key apply to the context in which the content-specific key is being generated. For instance, if a content item is not viewable without a certain subscription, and the master key stored at a device does not indicate that such a subscription is currently associated with the device, the device may fail to generate a valid content-specific key. A device may further retrieve updated master keys that reflect changing criteria (e.g. a new subscription) as needed.

In an embodiment, a content-specific key may also encode such criteria, and the device may be configured to validate the criteria before playing the content. In another embodiment, no constraints are imposed on a content-specific key, once generated. In embodiments, a device instead utilizes other techniques outside of the key-generation process to enforce various criteria such as the existence of a valid subscription.

In an embodiment, when connecting to a local server for the first time, a device must retrieve the master key for that local server from the DRM server, even if the device already has a master key for another local server. Hence, a device may have multiple master keys for different local servers. In an embodiment, master keys may be retrieved for multiple local servers during a provisioning process. For instance, during the provisioning process a device may receive all of the master keys for local servers in a certain geographic area. In an embodiment, each time a device connects to a local server, the device checks to see if the device has a master key for that local server. If not, the device retrieves a suitable master key, or prompts the user to begin a provisioning or registration process so that a suitable master key may be obtained.

In an embodiment, the master key for a local server need not be obtained before downloading content from the local server, but rather need only be obtained some time before the content is viewed.

The above described DRM scheme is provided for illustrative purposes. However, any other suitable DRM scheme may instead be utilized when practicing the described techniques.

3.6. Miscellaneous

Returning to FIG. 2, at block 290, based on verifying that respectively received digital rights information authorizes the portable media devices to play certain items of media content, the portable media devices play the content using any suitable content playback techniques. Note that flow 200 may be completed without the portable devices or even the local content servers connecting to the Internet, thus achieving an offline distribution and playback of content.

Flow 200 is one example of a technique for content distribution using the described systems. Other techniques may involve fewer or additional elements in varying arrangements. For instance, in an embodiment, block 250 may be omitted for devices that are pre-provisioned via a wireless service provider or manufacturer. As another example, block 280 may be omitted in systems without rights management or with different types of rights management schemes.

Example Offline Content Selection

In an embodiment, metadata describing available content items is downloaded to a portable device when the portable device accesses a first local content server and/or when the portable device accesses a content distributor website. Subsequently, while not connected to any local content server, a user may view the metadata by, for example, opening a content access client application on the device. The user may select content of interest while viewing this metadata. The device stores the selections. The device may optionally indicate, based on the metadata, geographic locations of local content servers to which the user may connect to download the selected content.

Subsequently, the device may detect and initiate a local connection to an available network, such as a connection to a certain wireless network. The application detects the presence of a second local content server, which may not necessarily be the same as the first local content server. The application automatically identifies, based on the stored selections and metadata from the second local content server, a selected content item that may be downloaded from the second local content server. Without necessarily being further prompted by the user, the application automatically downloads the content. The device notifies the user when the content has been downloaded.

Optionally, before allowing the user to select the content, or before downloading the content, the device can verify whether the device is actually allowed to play the content. If the device is not allowed to play the content, the device may ask the user to agree to pay for the content, should the device download the content. Or, the device may go ahead and download the content, but ask the user to pay for the content before allowing the user to view the content. Payment may be conducted over the Internet, via SMS, and/or with the assistance of promoter, as described in other sections.

Device-to-Device Sharing

According to an embodiment, another technique for distributing metadata and/or content items with portable media devices is for portable devices that have downloaded content from a local content server to share that content with other portable media devices that have been provisioned for access to the local content servers. For instance, two users of provisioned devices may meet each other on a subway or at a park or at any other suitable location. The users may activate the content distributor's content access application on their respective devices. The application instances may detect each other and, if approved by the users, initiate a transfer of metadata and/or content items, depending on the embodiment. The transfer may occur using any suitable peer-to-peer sharing technique.

If only metadata is transferred, the receiving device's application may analyze the metadata to determine if new content is available at an offline content server. If new content is available, and optionally if the metadata matches certain characteristics pre-defined by the user of the device, the device may optionally notify the user of the availability of the new content, which the user may then select for download using techniques such as described above. Otherwise, the application may simply update its metadata and use the updated metadata to present more up-to-date information to the user at a later time when the user requests such information. Meanwhile, if actual content items are to be transferred, the devices may search each other's inventories for content items of interest. When a content item of interest is found, the content item may be downloaded from the other device.

In some embodiments, the transfer of metadata and/or content items may be automatic, in that a user need not necessarily instruct the device to initiate the transfer. In some embodiments, the application is configured to run constantly in the background, and locate other provisioned devices automatically. Hence, for example, a user might be sitting on a subway while her device searches in the background for content of interest on devices owned by other passengers. By the time the user is done riding the subway, the device may notify the user that the device downloaded, for instance, three additional movies during the subway ride. In an embodiment, a user may be required to opt-in to such a feature, on account of privacy concerns and/or concerns about device battery life.

Seamless Switching Between Local Servers and a Central Server

In an embodiment, a client device within the described systems may access content and metadata both on local servers and on the central server, depending on the network connectivity of the device. When an item of content is available on both the central server and a local server, the device is configured to provide a seamless transition from utilizing the central server to utilizing the local server, and vice versa, as the device transitions between local connections and wide area network (e.g. Internet) connections. Thus, for example, a user may make content selections based on metadata provided by the central server over an Internet connection, and then receive the selected content when the device has a local connection to a local server.

In an embodiment, content access application software on the device is configured to manage download processes so as to permit partial downloads. A download process for a content item may begin, for instance, at one time with one local content server. The download process may be interrupted when the user takes the device away from the local content server before the download has concluded. The application may then resume the download when the device is again connected to a local content server, which need not be the same local content server that the download process began at.

Moreover, a download process may begin with an online connection to a central server over the Internet, be interrupted when Internet connectivity is lost, and conclude when the device connects to a local content server. Similarly, a download process may begin when the device connects to a local content server, be interrupted when the device leaves the vicinity of the local content server, and resume when the device is connected to the central server over the Internet.

Content Transfer Optimizations

In an embodiment, a content access application may show a progress screen comprising estimated time(s) remaining for downloading certain content items. Any suitable estimation technique may be used, but in at least one embodiment, the local content server may compute the estimate based on factors such as a current number of connections, an average transfer speed, a file size, and so forth. The application may also or instead generate a visual or audible notification when the user has left, or is close to leaving, the proximity of the local content server's wireless access point without having completed a download process. If the user wishes to finish the download, the user may thus choose to remain in the proximity until the download is complete. In an embodiment, the progress screen includes interface controls that allow the user to instruct the device to perform tasks such as stopping downloads of certain items, reprioritizing a download queue, downloading alternative (e.g. larger or smaller) versions of selected content items, viewing associated metadata, and so forth.

In an embodiment, instead of downloading content automatically when a local content server is available, a device may simply notify the user audibly and/or visually that certain content is available. The user may then select which content to download.

In an embodiment, a local content server is configured to automatically adjust various operating parameters to meet various quality of service metrics. For instance, the local content server may limit the number of active connections or downloads so as to ensure that active downloads are completed within a certain period of time. The local content server may prioritize certain types of operations, such as provisioning operations. The local content server may also or instead suggest to various users alternative connection mechanisms, such as USB connections, by which the users may speed up the download process in heavy usage situations. In an embodiment, certain classes of devices or users may be prioritized. For instance, a gold subscription may allow a device to always receive higher bandwidth downloads than a silver subscription.

Device-to-Local Server Content Sharing

In an embodiment, when a device connects to a local server, the device may share with the local server an inventory of content on the device. The inventory may include content that has been downloaded from the local server itself, from another local server, from the central server, and/or from any other suitable source within a content distribution system. The local server may compare the inventory to its own inventory. If the device's inventory includes content not found on the local server, the local server may request the content from the device. Depending on the embodiment and/or user preferences, the device may begin transferring the requested content immediately, wait to transfer the requested content until the device has downloaded other content from the local server, and/or request permission from a user of the device to begin transferring content to the local server.

In an embodiment, the user of device may be offered an incentive for sharing the content with the local server, such as a free content item from the local server's inventory, a credit to the user's account, an extension of the user's subscription, an unlock code for a specific item of content, or any other suitable incentive.

Advertisements

In an embodiment, in addition to downloading content from a local server, a device may also be configured to download advertisements from the local server, such as trailers for other items of content, banner advertisements, video commercials, and so forth. Advertisements may be distributed to the local server with content packages, by a connection to an advertisement server, or via any other suitable mechanism. For example, content trailers may be found in the metadata for a content item. Or, content trailers may be generated dynamically by, for instance, the local server extracting a short video clip from the relevant content item. Using a DRM mechanism such as the split key mechanism described above, the local server may be able to extract a trailer from a content item even if the local server is not itself able to decrypt the item (or the trailer).

The device may be configured to display the advertisements at any of a variety of times. For instance, before sending content to a device, a local server may send a set of trailers that the user of the device may watch while the content is downloading. Or, the device may be configured to play an advertisement before, after, or during presentation of a content item downloaded from the local server.

In an embodiment, the advertisements may customized based on user preferences and/or prior interactions between the device and the local server. The local server gathers group-based and/or device-specific analytics. For instance, the local server may track which content items have been downloaded most frequently or by a given device. As another example, an application may report to the local server which contents were played by the device, either fully or partially. The local server may, based on the analytics and on metadata associated with the advertisements, select a set of advertisements deemed most relevant to the user of the device, and send those advertisements to the device. As another example, the local server may send a content trailer for each of the most popular content downloads from the local server, or for each new content item at the local server.

In an embodiment, a local server may further receive analytics gathered by other local servers and/or the central server. The analytics may be shared directly over the Internet, or distributed with content packages. The shared analytics may also be used for personalized targeting of advertisements. Additionally, or instead, the analytics may be utilized for a variety of other purposes known within the art.

4.0. Example Embodiments

Example embodiments are represented in the following numbered clauses:

1. A system comprising: application software, resident on portable media playback devices, configured to play media content items; one or more local content servers, each local server of the one or more local content servers comprising: one or more storage devices storing local copies of the media content items; one or more communications interfaces configured to establish local connections between the local server and multiple media playback devices, of the portable media playback devices, that are within a certain proximity to the local server; logic, implemented at least partially by hardware at the local server, configured to cause the local server to send, over the local connections, copies of the media content items stored on the one or more storage devices to the multiple media playback devices when the local connections are established.

2. The system of Clause 1, wherein at least a first local server of the one or more local content servers is not connected to the Internet and is not connected to any other local content server.

3. The system of Clause 1, further comprising: a central data repository storing a superset of media content, including at least the media content items; a central server coupled to a wide area network, the central server configured to send copies of the media content items stored in the central data repository over the wide area network to certain media playback devices of the portable media playback devices, the wide area network not including any of the local connections between the one or more local content servers and the multiple media playback devices.

4. The system of Clause 1, further comprising: a central data repository storing a superset of media content, including at least the media content items; a content packaging component configured to generate content packages based on the superset of media content; wherein the one or more local content servers are configured to store the local copies of the media content items in response to receiving the content packages by one or more: receiving the content packages over a wide area network, or reading the content packages from a removable storage device.

5. The system of Clause 1, wherein at least a first local server of the one or more local content servers is configured to direct a given portable device to an installer file for the application software responsive to the given portable device establishing an initial connection to the first local server.

6. The system of Clause 1, wherein, upon a given device of the portable media playback devices establishing at least certain types connections, the application software on the portable device is configured to: send a message to a common address assigned to each local server of the one or more local content servers, and, when one of the local content servers is contactable via the common address, automatically download one or more content items or content metadata from the contacted local server.

7. The system of Clause 1, further comprising: a digital rights management server, separate from the local server, configured to generate rights information necessary for the application software to play certain content of the media content items on a given device; wherein the application software is configured to perform one or more of: requesting the rights information from the digital rights management server, or prompting a user to input the rights information; wherein the application software is further configured to determine whether a device is authorized to play certain content of the media content items based on reading the rights information.

8. The system of Clause 1, further comprising: a digital rights management server, separate from the local server, configured to generate rights information necessary for the application software to play certain content of the media content items on a given device; a Short Message Service ("SMS") gateway configured to relay SMS-based messages carrying the rights information from the digital rights management server to one or both of: the one or more local content servers or the portable media playback devices; wherein the application software is further configured to determine whether a device is authorized to play certain content of the media content items based on reading the rights information.

9. The system of Clause 1, wherein the application software is further configured to: present a menu of available content based on metadata from the one or more local content servers, receive input selecting content of interest from the menu when no connection to any of the one or more local content servers is available, and automatically download the content of interest upon detecting a connection to one of the one or more local content servers.

10. The system of Clause 1, wherein each of the local connections is one of an 802.11 wireless-based connection, Bluetooth connection, or Universal Serial Bus connection, wherein the media content items include digital movie files, wherein at least two or more of the multiple media playback devices are connected to a given local server concurrently.

11. A method comprising: based on a library of media content, a content distributor periodically generating one or more content packages comprising digital media content items from the library; storing the one or more content packages on one or more local media servers deployed at a plurality of different geographic locations, the one or more local media servers operated by promoting entities other than the content distributor; causing installation of, on the one or more local media servers, server application software comprising instructions that, when executed by the one or more local media servers, cause the one or more local media servers to send digital media content items from the one or more content packages to portable media playback devices that establish local connections to the one or more local media servers, the local connections being local area network connections or wired connections, the portable media playback devices executing client application software code generated by the content distributor, the client application software configured to allow the portable media playback devices to play the digital media content items only upon input of rights information; receiving, at a digital rights management server operated by the content distributor, requests for rights information to access the digital media content items; sending the rights information in response to the requests.

12. The method of Clause 11, wherein the requests for rights information are received via a Short Message Server ("SMS") gateway.

13. The method of Clause 11, further comprising: the content distributor periodically updating the one or more content packages to include new media content items; the content distributor periodically delivering updated storage devices comprising the updated one or more content packages to the promoting entities; storing the updated one or more content packages on the one or more local media servers; wherein the instructions of the server application software are configured to, based on the updated one or more content packages, cause a given local media server to automatically send a new content item to which a given device is subscribed responsive to the given device reconnecting to the given local media server.

14. The method of Clause 11, further comprising: the content distributor billing one of a promoting entity or an owner of a portable device in response to a request for the rights information.

15. The method of Clause 11, further comprising: copying at least a first content package of the one or more content packages to removable storage media; copying an installer for the client application software code to the removable storage media; distributing the removable media drive to promoting entities for sale to users of the portable media playback devices, the portable media playback devices configured to execute the installer on the removable storage media to install the client application software code, the client application software code configured to play media content items in the first content package stored on the removable storage media, the one or more local media servers configured to send new content items to replace media content items in the first content package.

16. One or more non-transitory computer-readable media storing instructions that, when executed by one or more computing devices, cause: storing, at a plurality of local media servers, media content collections; establishing local connections between particular local servers of the local media servers and particular mobile devices of a plurality of mobile devices, the local connections being one or both of: local area network connections, or peer-to-peer connections; receiving, at a central digital rights management server, requests to unlock access for the particular mobile devices to content items in the media content collections; sending, from the central digital rights management server, responses comprising rights information for the particular mobile devices to unlock access to the content items; transmitting the content items from the particular local servers to the particular mobile devices over the local connections, the mobile devices configured to utilize the rights information to determine whether the mobile devices are permitted to play the particular content items.

17. The one or more non-transitory computer-readable media of Clause 16, wherein the requests to the central digital rights management server and the responses from the central digital rights management server are sent via SMS messages.

18. The one or more non-transitory computer-readable media of Clause 16, wherein the instructions, when executed by the one or more computing devices, further cause: a particular mobile device establishing a first connection to a first local server of the plurality of local media servers; the first local server directing the particular mobile device to install a content access application; the content access application causing the particular mobile device to download at least first content items of the particular content items from the first local server; the particular mobile device subsequently establishing a second connection to a second local server of the plurality of local media servers; upon detecting the second connection, the content access application automatically causing the particular mobile device to download at least second content items of the particular content items from the second local server.

19. The one or more non-transitory computer-readable media of Clause 16, wherein the instructions, when executed by the one or more computing devices, further cause: a first mobile device establishing a first connection to a first local server of the plurality of local media servers; the first mobile device downloading, through a content access application installed on the first mobile device, metadata describing a catalog of content items available at the first local server; the first mobile device detecting a second mobile device on which the content access application is installed; responsive to detecting the second mobile device, the first mobile device sharing the metadata describing the catalog to the second mobile device; based on the metadata received from the first mobile device, the second mobile device displaying information about one or more content items that are newly available at one or more of the local media servers.

20. The one or more non-transitory computer-readable media of Clause 16, wherein the instructions, when executed by the one or more computing devices, further cause: a first mobile device establishing a first connection to a first local server of the plurality of local media servers; the first mobile device downloading, through a content access application installed on the first mobile device, first content stored at the first local server; the first mobile device detecting a second mobile device on which the content access application is installed; responsive to detecting the second mobile device, the first mobile device sharing the first content with the second mobile device; the second mobile device playing the first content responsive to reading rights information data from the digital rights management server indicating that the second mobile device is permitted to play the first content.

21. The one or more non-transitory computer-readable media of Clause 16, wherein the instructions, when executed by one or more computing devices, further cause: sending, from the local media servers to the particular mobile devices, partial content-specific decryption keys for the content items; wherein the rights information sent by the central digital rights management server includes master keys that are specific to one or more of the local media servers; generating, at the particular mobile devices, based on the partial content-specific decryption keys and the master keys, content-specific decryption keys for decrypting specific items of the content items.

22. The one or more non-transitory computer-readable media of Clause 16, wherein the instructions, when executed by one or more computing devices, further cause: identifying, by a given device of the plurality of mobile devices, a media profile that is preferred for media playback at the given device; based on the identified media profile, selecting, by the given device, a specific version of a given content item for download from a given local server.

23. The one or more non-transitory computer-readable media of Clause 16, wherein the instructions, when executed by one or more computing devices, further cause: a given device establishing a wide area network connection with a central media server; the given device downloading metadata describing a catalog of content from the central media server; the given device receiving user input selecting a specific item of content in the catalog for download; the given device downloading at least a portion of the specific item over a local connection from one of the local media servers, instead of from the central media server.

24. The one or more non-transitory computer-readable media of Clause 16, wherein the instructions, when executed by one or more computing devices, further cause: a given device downloading a first portion of a specific item of content over a local connection with a local media server; the given device downloading a second portion of the specific item over a wide area network connection with a central media server.

5.0. Implementation Mechanism—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
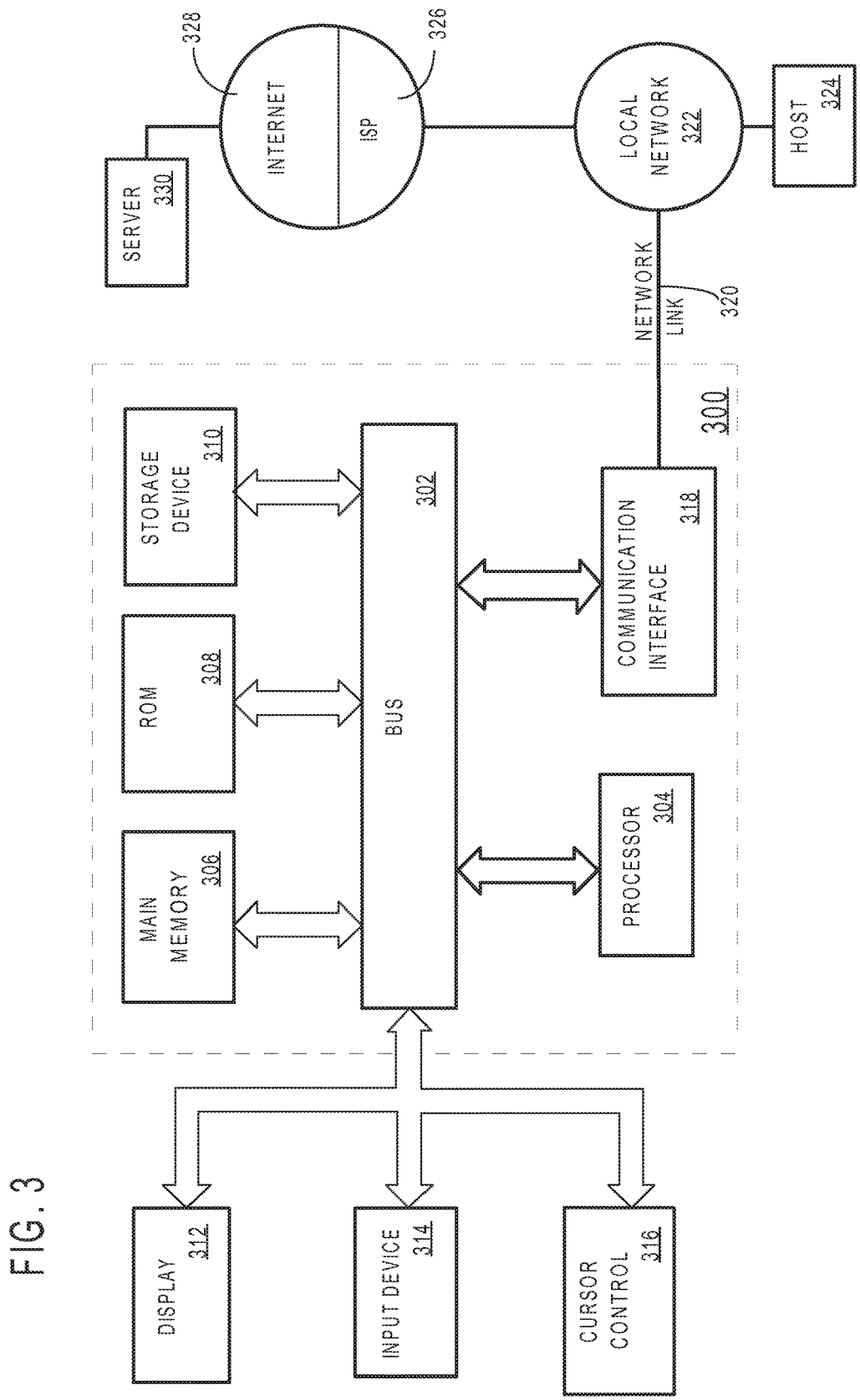
FIG. 3 is block diagram of a computer system upon which embodiments of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In an embodiment, some or all of the systems described herein may be or comprise server computer systems, including one or more server computer devices that collectively implement various components of the system as a set of server-side processes. The server computer systems may include web server, application server, database server, and/or other conventional server components that the depicted components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In an embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an embodiment, the cloud-based components may be implemented by third third-party entities, on behalf of another entity for whom the components are deployed. In other embodiments, however, the described systems may be implemented entirely by computer systems owned and operated by a single entity.

6.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory computer-readable media storing instructions that, when executed by one or more computing devices, cause performance of:
    receiving a collection of media content at a first mobile device, the collection including a plurality of videos;
    executing a local content server at the first mobile device, the first mobile device configured to accept local connections from other mobile devices, the first mobile device storing the collection of media content;
    establishing a local connection between the first mobile device and a given mobile device;
    receiving, at the first mobile device, data from a content access client application on the given mobile device;
    based on the data from the content access client application, the first mobile device recognizing the given mobile device as being provisioned for access to content from the collection;
    responsive to the local content server recognizing that the given mobile device has been provisioned for access to content from the collection, the first mobile device transmitting one or more media content items from the collection of media content to the given mobile device over the local connection, the one or more media content items including at least one video.

2. The one or more non-transitory computer-readable media of claim 1, wherein the collection changes over time to include new media content items, wherein the instructions, when executed by the one or more computing devices, cause performance of, when the given mobile device connects subsequent times to the first mobile device, the first mobile device transferring the new media content items to the given mobile device.

3. The one or more non-transitory computer-readable media of claim 1, wherein the instructions, when executed by the one or more computing devices, further cause performance of, when the given mobile device connects to the first mobile device:
    the first mobile device sending a request to a rights management server for rights information for the given mobile device to access the one or more media content items;
    the first mobile device receiving the rights information;
    the first mobile device sending the rights information to the given mobile device, the given mobile device configured to utilize the rights information to access the one or more media content items that it receives from the first mobile device.

4. The one or more non-transitory computer-readable media of claim 3, wherein the instructions, when executed by the one or more computing devices, further cause performance of:
    the first mobile device sending the request to the rights management server via a first SMS message;
    the first mobile device receiving the rights information via a second SMS message.

5. The one or more non-transitory computer-readable media of claim 1, wherein the instructions, when executed by the one or more computing devices, further cause performance of:
    the first mobile device at least partially provisioning the given mobile device for access to the collection by performing one or more of: sending a content access client application to the given mobile device for installation at the given mobile device, collecting account information from the given mobile device, or sending a master key to the given mobile device.

6. The one or more non-transitory computer-readable media of claim 1, wherein the instructions, when executed by the one or more computing devices, further cause performance of determining that the given mobile device is provisioned for access to the collection by one or more of:
    receiving a message from the given mobile device that is addressed to a specific address at the local content server;
    receiving communication that is recognized to have been sent by the content access client application executing on the given mobile device;
    receiving, from the given mobile device, valid credentials from the first mobile device.

7. The one or more non-transitory computer-readable media of claim 1, wherein the instructions, when executed by the one or more computing devices, further cause performance of detecting that the given mobile device is provisioned for access to the collection based at least in part on a subscription associated with the given mobile device.

8. The one or more non-transitory computer-readable media of claim 1, wherein the instructions, when executed by the one or more computing devices, further cause performance of:

receiving, at the local content server, a selection of the one or more media content items from the given mobile device.

9. The one or more non-transitory computer-readable media of claim 1, wherein the instructions, when executed by the one or more computing devices, further cause performance of:
sending metadata describing the collection from the first mobile device to the given mobile device;
subsequent to sending the metadata, receiving, at the first mobile device, a selection of the one or more media content items from the given mobile device.

10. The one or more non-transitory computer-readable media of claim 1, wherein the instructions, when executed by the one or more computing devices, further cause performance of:
executing a wireless access point at the first mobile device, the wireless access point hosting a network having a specific identifier, the local connections made via the wireless access point;
configuring the given mobile device during a provisioning process to automatically connect to wireless access points that host networks having the specific identifier, and to automatically communicate with local content servers on the networks having the specific identifier.

11. A system comprising:
a first mobile device configured to:
receive a collection of media content, the collection including a plurality of videos;
store the collection of media content
execute a local content server;
accept local connections from other mobile devices;
establish a local connection between the first mobile device and a given mobile device;
receive data from a content access client application on the given mobile device;
based on the data from the content access client application, recognize the given mobile device as being provisioned for access to content from the collection;
responsive to the local content server recognizing that the given mobile device has been provisioned for access to content from the collection, transmit one or more media content items from the collection of media content to the given mobile device over the local connection, the one or more media content items including at least one video.

12. The system of claim 11, wherein the collection changes over time to include new media content items, wherein the first mobile device is further configured to, when the given mobile device connects subsequent times to the first mobile device, transfer the new media content items to the given mobile device.

13. The system of claim 11, wherein the first mobile device is further configured to, when the given mobile device connects to the first mobile device:
send a request to a rights management server for rights information for the given mobile device to access the one or more media content items;
receive the rights information;
send the rights information to the given mobile device, the given mobile device configured to utilize the rights information to access the one or more media content items that it receives from the first mobile device.

14. The system of claim 13, wherein the first mobile device is further configured to:
send the request to the rights management server via a first SMS message;
receive the rights information via a second SMS message.

15. The system of claim 11, wherein the first mobile device is further configured to at least partially provision the given mobile device for access to the collection by performing one or more of: sending a content access client application to the given mobile device for installation at the given mobile device, collecting account information from the given mobile device, or sending a master key to the given mobile device.

16. The system of claim 11, wherein the first mobile device is further configured to determine that the given mobile device is provisioned for access to the collection by one or more of:
receiving a message from the given mobile device that is addressed to a specific address at the local content server;
receiving communication that is recognized to have been sent by the content access client application executing on the given mobile device;
receiving, from the given mobile device, valid credentials from the first mobile device.

17. The system of claim 11, wherein the first mobile device is further configured to detect that the given mobile device is provisioned for access to the collection based at least in part on a subscription associated with the given mobile device.

18. The system of claim 11, wherein the first mobile device is further configured to receive, at the local content server, a selection of the one or more media content items from the given mobile device.

19. The system of claim 11, wherein the first mobile device is further configured to send metadata describing the collection from the first mobile device to the given mobile device, and subsequent to sending the metadata, receive, at the first mobile device, a selection of the one or more media content items from the given mobile device.

20. The system of claim 11, wherein the first mobile device is further configured to:
execute a wireless access point at the first mobile device, the wireless access point hosting a network having a specific identifier, the local connections made via the wireless access point;
wherein the given mobile device is configured during a provisioning process to automatically connect to wireless access points that host networks having the specific identifier, and to automatically communicate with local content servers on the networks having the specific identifier.

* * * * *